United States Patent
Metternich (10) Patent No.: US 9,238,430 B2
(45) Date of Patent: Jan. 19, 2016

(54) LOCKING DEVICE

(71) Applicant: Neuland Beton H. Burgis KG (GmbH & Co.), Hamburg (DE)

(72) Inventor: Heinz-Ruediger Metternich, Eversen-Heide (DE)

(73) Assignee: Neuland Beton H. Burgis KG (GmbH & Co.), Hamburg (DE)

( * ) Notice: Subject to any disclaimer, the term of this patent is extended or adjusted under 35 U.S.C. 154(b) by 0 days.

(21) Appl. No.: 14/406,788

(22) PCT Filed: Jun. 21, 2013

(86) PCT No.: PCT/DE2013/100227
§ 371 (c)(1),
(2) Date: Dec. 10, 2014

(87) PCT Pub. No.: WO2014/000732
PCT Pub. Date: Jan. 3, 2014

(65) Prior Publication Data
US 2015/0147130 A1    May 28, 2015

(30) Foreign Application Priority Data

Jun. 26, 2012  (DE) ..................... 20 2012 102 343 U (51) Int. Cl.
*B60P 7/08* (2006.01)
*B60P 7/13* (2006.01)
*B60P 7/10* (2006.01)

(52) U.S. Cl.
CPC . *B60P 7/132* (2013.01); *B60P 7/10* (2013.01); *B60P 7/13* (2013.01)

(58) Field of Classification Search
CPC ............... B60P 7/10; B60P 7/132; B60P 7/13
USPC ........... 410/69, 70, 72, 73, 76, 77, 79, 80, 82, 410/83
See application file for complete search history.

(56) References Cited

U.S. PATENT DOCUMENTS

| | | | |
|---|---|---|---|
| 2007/0212182 A1* | 9/2007 | Brewster | ......................... 410/82 |
| 2013/0251473 A1 | 9/2013 | Metternich | |

FOREIGN PATENT DOCUMENTS

| | | |
|---|---|---|
| EP | 2308719 A1 | 4/2011 |
| WO | 2007142531 A2 | 12/2007 |
| WO | 2008095605 A1 | 8/2008 |
| WO | 2011071384 A1 | 6/2011 |
| WO | 2012022326 A1 | 2/2012 |

OTHER PUBLICATIONS

International Search Report in International Application No. PCT/DE2013/100227, dated Sep. 16, 2013.

* cited by examiner

*Primary Examiner* — Stephen Gordon
(74) *Attorney, Agent, or Firm* — Patent Central LLC; Stephan A. Pendorf (57) ABSTRACT

A locking device for locking a container on a loading surface. A locking head of the mechanism protrudes through a standardized reception opening and projects above the loading surface to engage and behind a wall of a corner fitting of the container to lock the container on the loading surface. A grooved bushing is disposed below the standardized reception opening. The locking device is guided in the grooved bushing so that it can be lowered to a first position below the loading surface. The locking device is supported on the grooved bushing, protruding upwards beyond the loading surface, in a second position. A securing ring holds the locking device below the loading surface in a mounting opening in the first position. The locking device has a (semi-) automatic locking mechanism in a cylindrical housing. The cylindrical housing is guided through the grooved bushing, the mounting opening and the securing ring.

13 Claims, 6 Drawing Sheets

LOCKING DEVICE

The invention relates to a locking device for locking a container, the container having standard corner fittings with an opening in a wall, onto a loading surface, which loading surface has a standardized receiving opening, wherein the locking device is guided in the standardized receiving opening of the loading surface and has a projecting locking head, whereby the locking head can engage through the opening and behind the wall of the corner fitting for locking the container onto the loading surface, with a grooved bushing disposed under the standardized receiving opening of the loading surface, in which grooved bushing the locking device is guided in a first position to be retractable under the loading surface and on which grooved bushing the locking device is supported in a second position projecting upwards above the loading surface, and a retaining ring which holds the locking device below the loading surface in a mounting opening in its first position.

Such locking devices are known under the name twist-lock for securing of containers on container carrier wagons, especially container semi-trailers or chassis. It is a retractable twist-lock which can, depending on the requirements, be lowered under the loading surface so that in this first position, for example, a 40 ft container can be loaded to the chassis, while the twist-lock is positioned in the second position, protruding above the loading surface, for example, if two 20 ft containers are loaded on the chassis.

The twist-lock has a pivot pin with an elongated mushroom head, which during the loading of a container is inserted in the opening of the corner fitting with centering by the mushroom shape. An operator then rotates the pivot about 90° so that the elongated mushroom head engages behind the wall of the corner fitting, whereby a positive connection between the container and the loading surface is made. Next the operator uses a clamping nut, which is guided on the threaded pivot pin, to tension the mushroom head of the pivot pin such that the wall of the corner fitting of the container is pressed onto the back of the chassis. In this way the container is fixed to the chassis without play.

For lowering such a locking device, a grooved bushing which is arranged about the pivot pin below the cargo area is rotated by approximately 90°, so that the entire twist lock can be lowered in the standardized receiving opening of the loading surface. The twist lock can not fall down through the securing ring which is screwed onto the mounting opening, but rather lies on this securing ring.

These known locking devices (twist locks) are used by the millions worldwide. The disadvantage is that, for locking and clamping a container in the loading surface, a manual operation by an operator is always required.

Further, there are known from WO 2012/022326 A1 (semi-) automatic locking devices for locking a container on a loading surface, which are triggered automatically by the loading of the container on the loading surface. This locking device has spring-loaded locking levers, which during charging of a container engage spring-loaded behind the corner fitting. In this case, a locking of the locking lever is additionally provided in this closed position. To unload, this lock must be unlocked separately manually. Then, the container with his corner fitting can be lifted off the loading surface, wherein the locking levers under spring bias release their locked position. A subsequent loading is again possible.

A disadvantage of this automatic lock is that subsequent conversion of existing container trailers is very expensive since space for the automatic locking mechanism must be created at the desired locking positions.

The object of the invention is to provide an automatic locking device with which even existing container trailers can be easily converted.

This object is achieved with a locking device according to claim 1.

Since the locking device has a (semi-) automatic locking mechanism in a cylindrical housing, with the cylindrical body is guided by the grooved bushing, the mounting opening and the retaining ring, it is possible to replace a container trailer mounted twist-lock with an automatic locking mechanism directly via the standardized receiving opening of a loading surface, in particular without additional conversion work. The cylindrical body in this case contains all the components necessary for the automatic locking mechanism, wherein the length and the outer diameter of the cylindrical body are formed so that it can be introduced through the mounting opening and seated against the standardized receiving opening and fixed with the retaining ring. The retractable function is maintained as in a previously installed twist-lock via actuation of a grooved bushing. However, the locking device is advantageously equipped with an automatic locking mechanism. This is particularly ensured if the cylindrical housing has an outer diameter d of d≤82.5 mm and has a height of h≤97 mm.

Since the locking head is formed of a first locking lever and a second locking lever, the locking levers pivotally mounted in the manner of a scissor mechanism to a shaft oriented perpendicularly to a loading and unloading direction and displaceable in this direction and the shaft being slidable into the loading position of the locking device in the direction of the corner fitting of the container and slidable in the opposite direction into its basic position, a spring-loaded mechanical lock mechanism is accommodated in the small cylindrical housing, which allows the automatic locking of containers loaded onto the loading surface as known from WO 2012/022326 A1. This ensures that, during loading, the locking levers of the locking device are pivoted inwards against the force of a spring, and at the same time forcibly raised via the knee lever assembly. Once the opening of the corner fitting has slid past the bevels or centering means, the spring preloaded locking levers jump back to their base position, wherein the locking heads of the locking levers are forced to retract by the knee lever and slidably guided shaft, so that the locking heads in their locking position, referred to below as basic position, lie against the inside of the wall of the corner fitting and thus engage snugly-fitting behind the corner fitting.

The two locking levers are arranged on the shaft in a scissors arrangement. Due to the double, two-sided locking a high reliability of the locking device is achieved and high breakaway force from the locked state is ensured. In order to ensure a matching sequence of movements of the two locking levers of the scissor assembly, each locking lever is assigned a toggle lever. If between the shaft and a fixed point a spring as at least one tension spring is used, a structurally simple design biasing the locking lever to its home position (locked position) is guaranteed.

To prevent unintentional lifting the container, for example during road and rail transport, a blocking means is provided. In order to prevent an unintentional release of the blocking means, it is spring loaded in the direction of the blocking position. The blocking means prevents, in its blocking position, for example, a pivoting back, because it engages the toggle joint, and in a release position allows a movement of the locking levers out of the base position into the loading position.

Since the blocking means has a charging latching position in which the blocking means is locked in the release position with a hinged latch, wherein during loading the hinged latch is pivoted against the force of a compression spring by the pivoting of the locking lever and the charging latching position is released, the blocking means can be preset such that a loading operation is possible without simultaneous manual actuation of the blocking means. Also, by the release means, simultaneously with the achievement of a loaded condition, the blocking means is activated, so that a movement out of the locking position (basic position), and thus a lifting/unloading of the container, is not possible.

When the blocking means has an actuating element, with which an operator can adjust the charging locking position, in which the blocking means is locked in the release position for the unloading and the next loading operation, a releasing of the blocking means prior to the unloading process can occur.

Thereby, that for forming a blocking means, the sliding shaft is formed protruding beyond the outer side of the cylindrical housing and a grooved bushing having two diametrically opposite inverted T-shaped elongate holes, into which the protruding, movable shaft engages, it is achieved in an alternative manner, that a movement out of the lock position (base position) and thus lifting/unloading of the container, is securely blocked. Preferably the grooved bushing mounted pivotally about its shaft is spring biased in the direction of its basic position, wherein in the base position the projecting slidable shaft is seated at one end of the T-shaped elongate slots.

If the blocking means comprises a charging latching position in which the blocking means is locked with a pivot lever in the release position, wherein during loading, by the load of the container, the pivoting lever pivots back against a spring blade force, whereby the grooved bushing is pivoted into its center position due to the spring bias, a pre-release is achieved so that unloading of the container is possible without further manual work.

If the locking levers have a shoulder on the side facing the wall inside the corner fitting, which in the basic position lie substantially orthogonal to the loading and unloading direction (Z) on the wall (21) within the corner fitting (20) and during unloading by pivoting in the loading position form a ramp, which allows the pivoting of the locking lever (14, 15) in the loading position against the force of the spring (43), an unloading with very low release force is ensured.

In the following, two embodiments of the invention are described in detail with reference to the accompanying figures.

In which.

Figure 1:
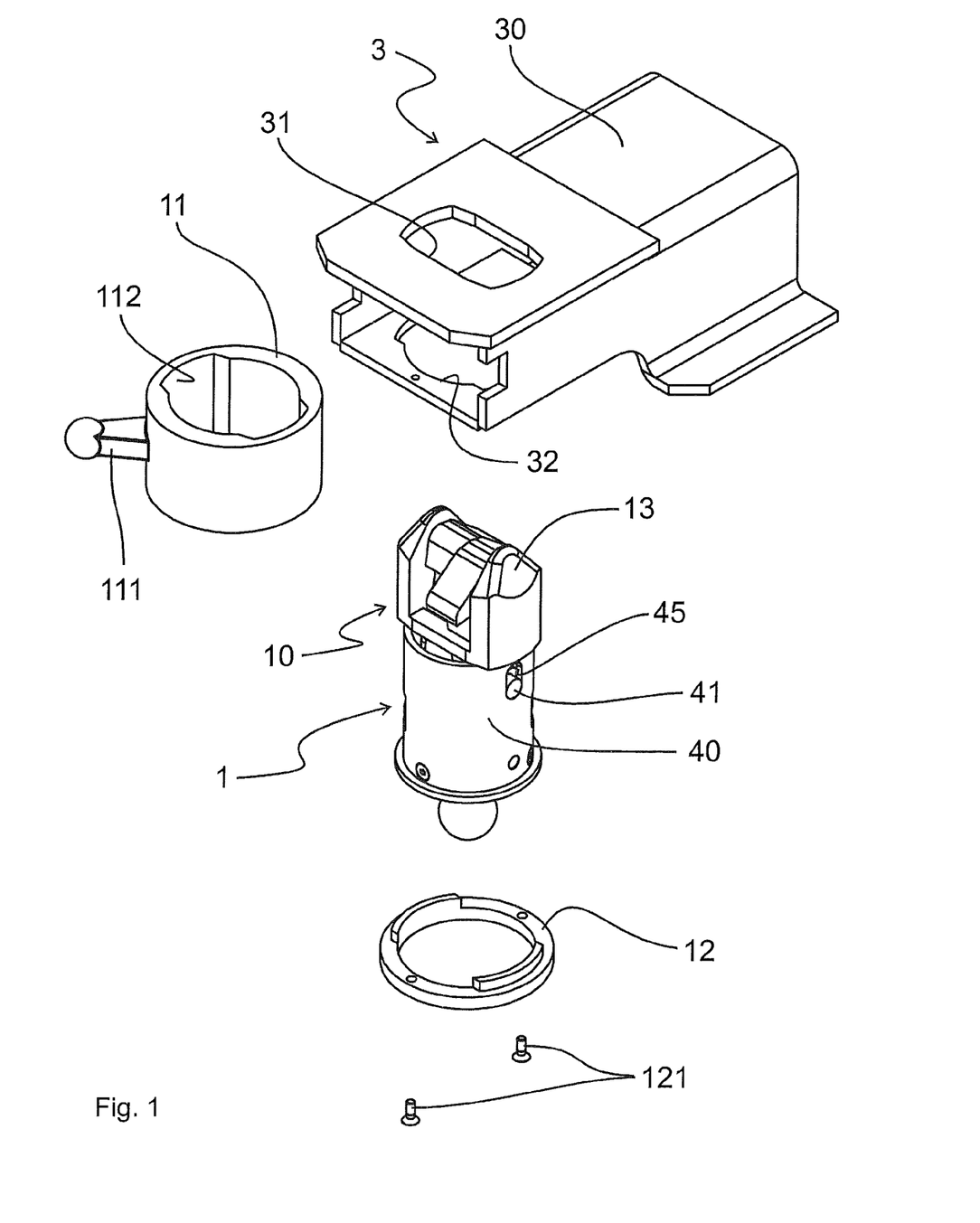
FIG. 1 shows a first embodiment in an exploded view the information necessary for the assembly of the locking device on a loading surface components, FIG. 2 in a three-dimensional view provided for in a cargo area locking device of FIG. 1 in a first position.

In FIG. 1, the components required for mounting onto a container car, in particular a container carrier semi-trailer, are shown in a first embodiment in an exploded view. The container semi-trailer has a loading surface 3, of which a section of a cross-beam 30 is shown, the outer end of this loading surface 3 being provided with a receiving opening 31. Below this receiving opening 31, a mounting opening 32 is formed in the hollow profile cross-beam 30.

In addition to the lateral opening in the transverse member 30, a grooved bushing 11 is shown that is insertable into the transverse beam 30 between the receiving opening 31 and the mounting opening 32. The grooved bushing 11 has an operating lever 111, which projects out from the cross-beam 30.

Below the cross-beam 30 a locking device 1 is shown in the exploded view of FIG. 1. The locking device 1 includes a locking head 10 and below the locking head 10 a locking mechanism 4 (see for example FIG. 5) which is accommodated in a cylindrical housing 40.

Below the locking device 1, a retaining ring 12 is shown with associated fastening screws 121, which, after insertion of the grooved bushing the 11 between the receiving opening 31 and mounting opening 32 and insertion of the locking device 1 from below through the mounting opening 32 into the grooved bushing 11, is seated in the mounting opening 32 and is there affixed with the screws.

Figure 2:
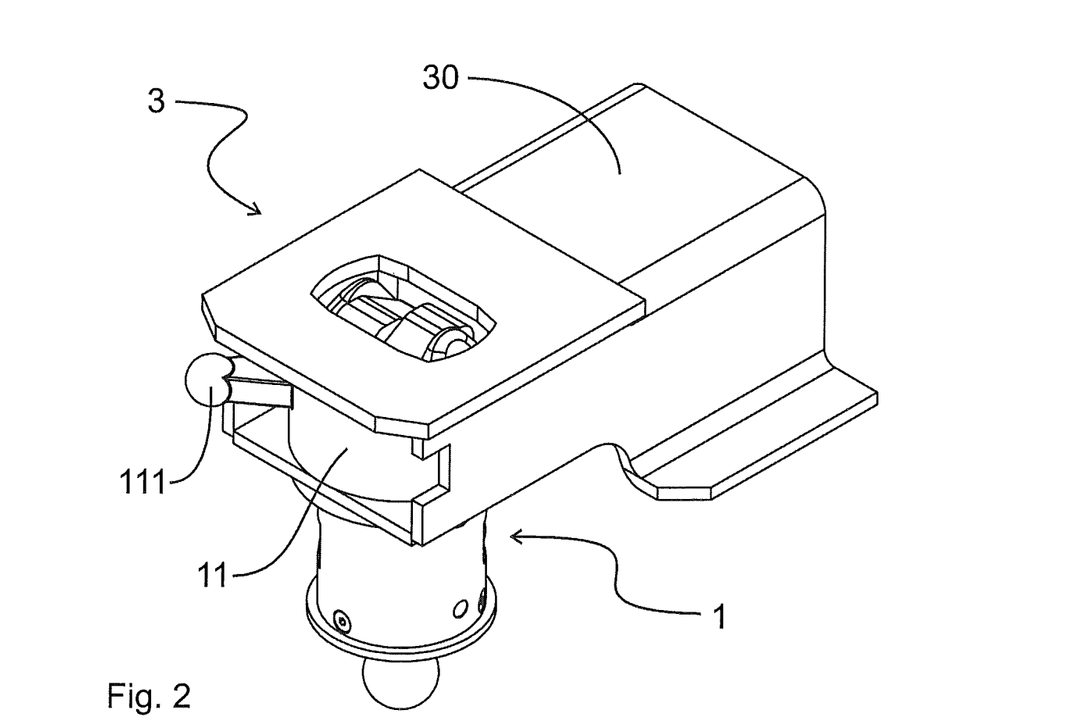

In FIG. 2, the portion of the cross-beam 30 of the loading surface 3 of the container semi-trailer is in turn shown in three-dimensional view. The locking device 1 mounted on the cross-beam 30 in the region of the receiving opening 31 and mount opening 32 is, in the state shown in FIG. 2, in a first position, wherein the locking head 10 is countersunk in the receiving opening 31 below the loading surface 3. Accordingly, the grooved bushing 11 is shown in FIG. 2 with its actuating lever 111 oriented to the left position.

Figure 3:
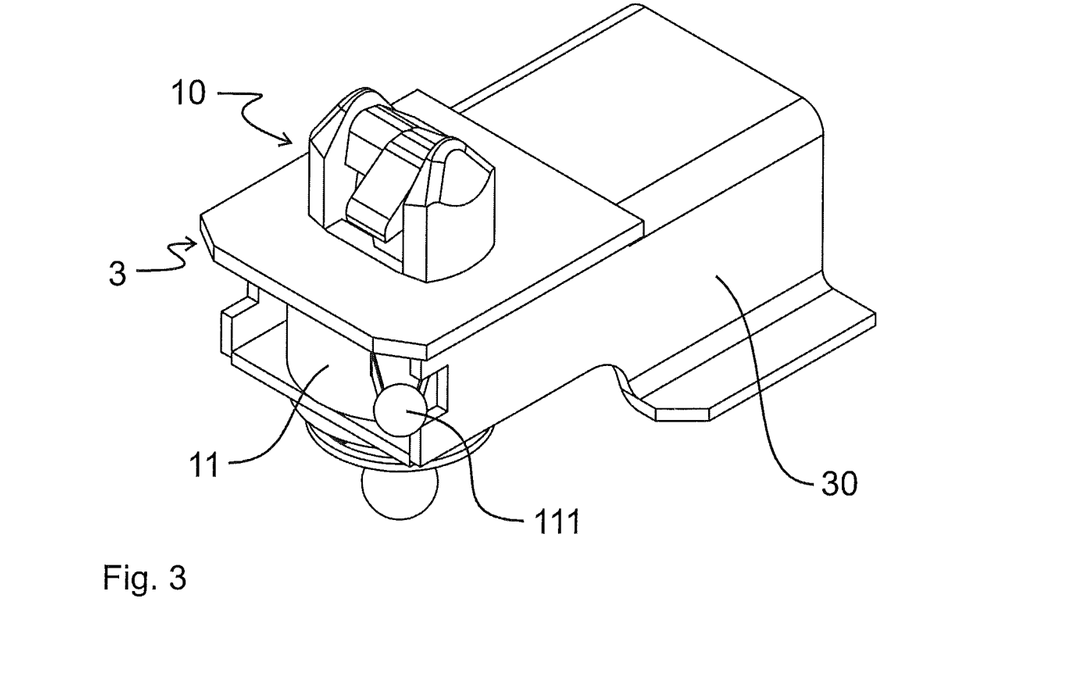
FIG. 3 shows the locking device illustrated in FIG. 2 in a second position, FIG. 4a-c a loading process with automatic locking.

In FIG. 3 the locking device 1 is shown in a second position, wherein the locking head 10 protrudes above the loading surface 3 and is ready for locking with a container corner fitting. The operating lever 111 of the grooved bushing 11 is correspondingly pivoted to the right position, so that the grooved bushing 11 is rotated about 90 .degree. As can be seen in FIG. 1, the grooved bushing 11 has such a profiled opening 112, that in the first position of the locking head 10 it fits therethrough and in the second position the laterally projecting edges of the locking head 10 rest on the grooved bushing 11 in the region of the larger wall thickness, thus protruding above the loading surface 3.

This principle is known from the retractable twist-lock latches and with regard to the components the grooved bushing 11 and the retaining ring 12 is identical. Also, since the receptacle opening 31 and the mounting opening 32 are always formed on cross-beams 30 of container semi-trailers in standard form, a direct interchangeability, disassembly of a conventional twist lock locking device and mounting of a locking device 1 according to the invention can be carried out, wherein the exchanged locking device 1 is likewise formed manually adjustable from a lowered first position to a protruding second position. In addition, the locking device 1 includes the previously mentioned locking mechanism 4 for automatically locking during loading of the so equipped loading surface 3 with a container 2. The manner of operation is illustrated in the FIGS. 4a to 4c in three operating states. The details of the mechanism are not delved into in this brief functional representation.

Figure 4A:
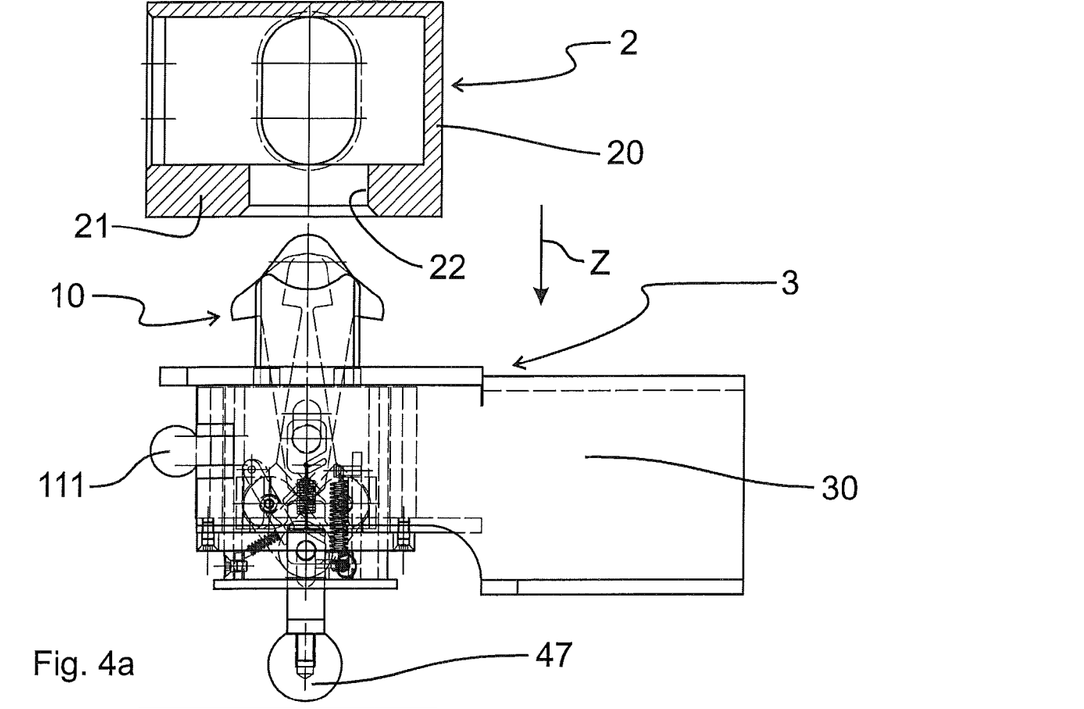

FIG. 4a illustrates the state in which the locking device 1 is in the loading detent position, i.e., can be loaded with a container 2. The container 2 is shown by its corner fitting 20.

Figure 4B:
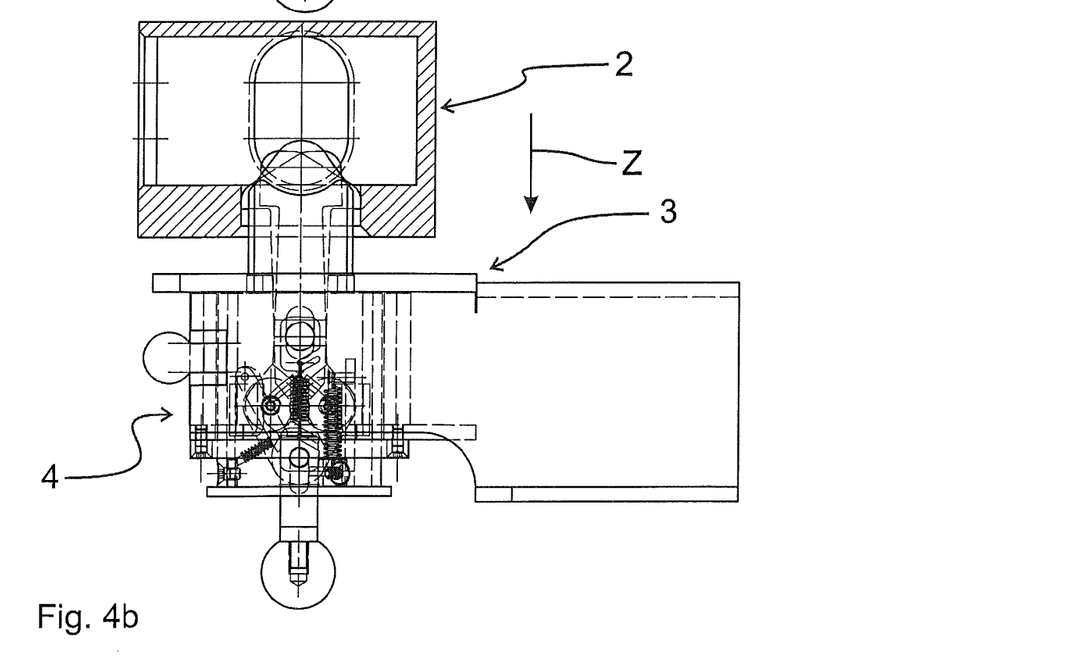

In FIG. 4b of the corner fitting 20 slips just over the locking head 10, wherein the locking levers 14, 15 associated with the locking mechanism 4 are moved towards each other by means of their sloping contact portions guided along the wall 21 near the opening 22 of the corner fitting 20.

Figure 4C:
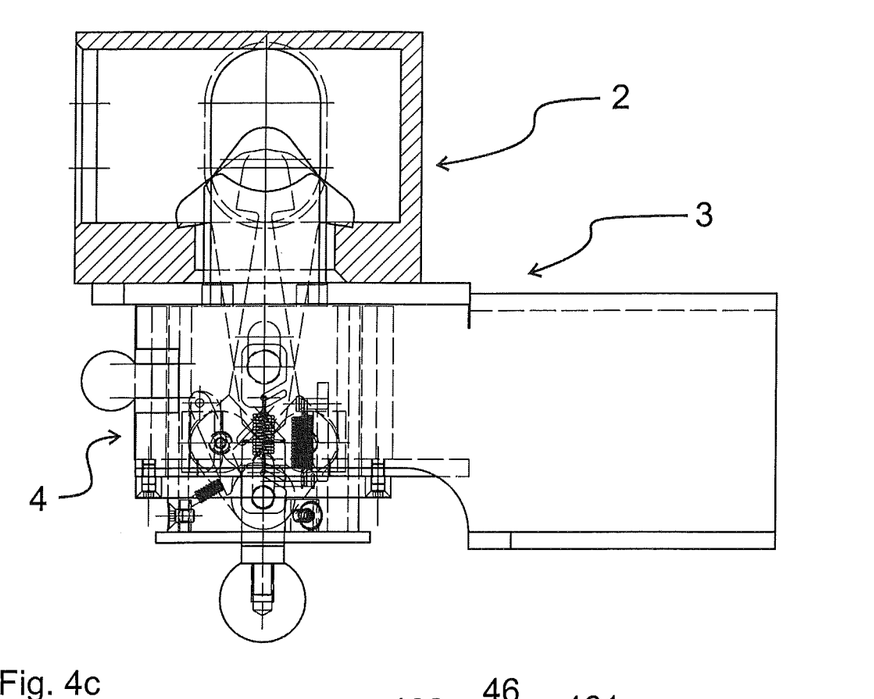

In FIG. 4c, the container 2 is placed on the loading surface 3 and the locking levers 14, 15 engage behind the wall 21 in the region of the opening 22 of the corner fitting 20, with which the container 2 is automatically locked onto the loading surface 3.

Figure 5:
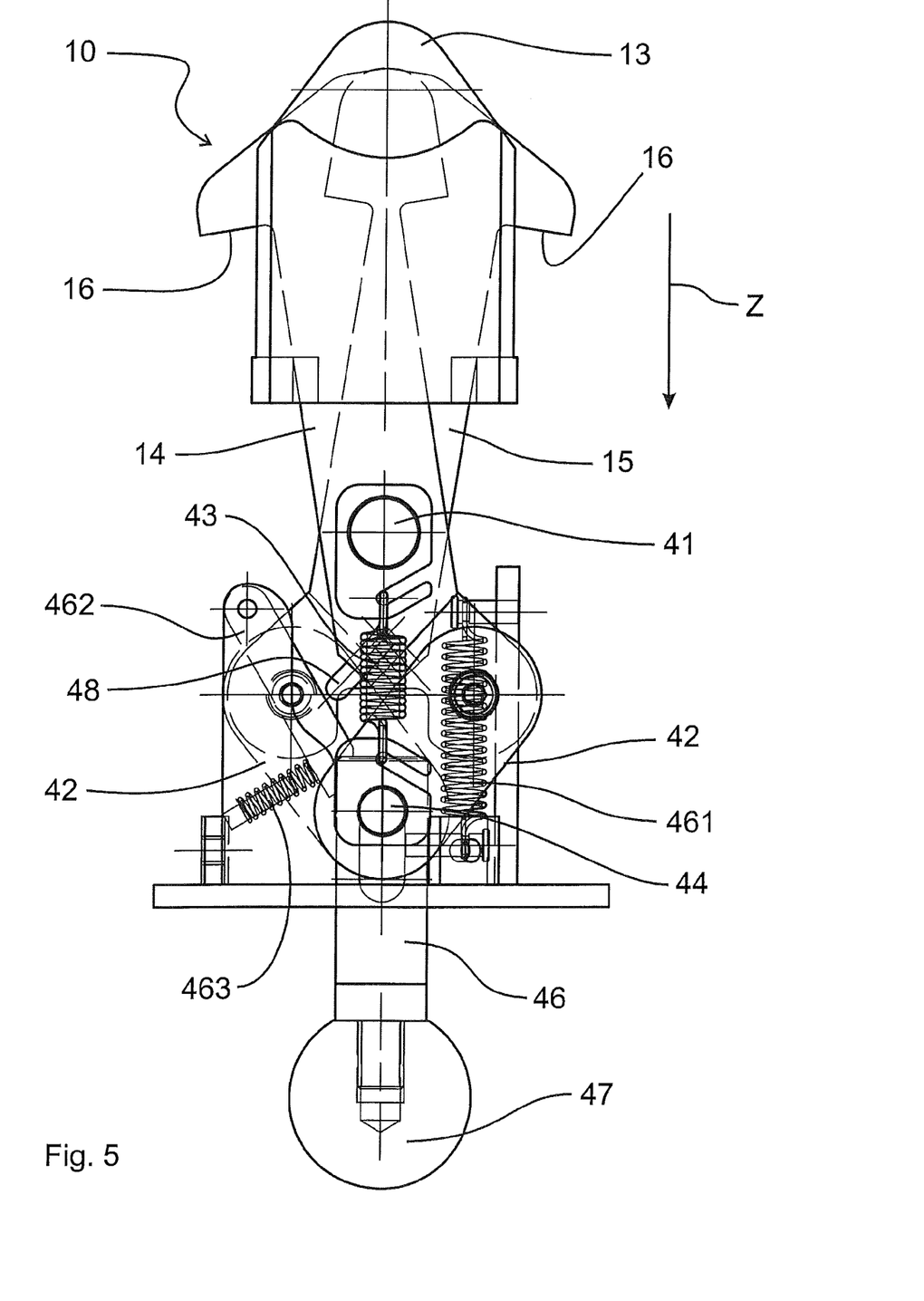
FIG. 5 shows the locking device of FIGS. 1 to 4 with its lock mechanism, FIG. 6 in a spatial detail view of a blocking means for locking the device of FIGS. 1 to 5.

FIG. 5 shows the locking mechanism 4 within the cylindrical housing 40 shown in FIG. 1, which is removed here. Furthermore, the locking head 10 of the locking device 1 is shown. The locking head 10 has an oval cross-section in top view, wherein at the ends of the longitudinal sides centering means 13 are provided that are immobile and have run-up bevels for centering a corner fitting 20 to be seated thereupon. The oval shape of the lock head 10 is in conformance with the standards for containers 2, so that the locking head 10 fits into the opening 22 of the corner fitting 20 of containers 2. Between the centering means 13 provided on the two ends of the locking head 10, two adjacently arranged locking levers 14, 15 are provided, which are arranged in the manner of a scissors mechanism pivotable about a shaft 41. The shaft 41 is supported slidable in the loading and unloading direction Z in short slots 45 in the housing 40 as shown in FIG. 1.

Below the sliding shaft 41 a fixed shaft 44 is provided parallel to the sliding shaft 41. The first locking lever 14 and the second locking lever 15 are pivotally mounted on the sliding shaft 41, wherein in each case at their downwardly projecting end one elbow or toggle lever 42 is provided for pivotal connection with the fixed shaft 44. Between the sliding shaft 41 and the fixed shaft 44, a tension spring 43 is mounted under tension, which spring-load biases the sliding shaft 41 towards its lower position, that is, the locking levers 14, 15 are pivoted via the elbow lever 42 in the locking position (see for example FIGS. 4a, 4c and 5).

Due to the spring bias, the locking levers 14, 15, once they have been moved towards each other via the run-up bevels during container loading as shown in FIG. 4b, pivot again into their locking position as shown in FIG. 4c. In this case, the locking lever 14, 15 shoulders 16 formed below the heads lay on the inner wall 21 of the opening 22 of the corner fitting 20, as shown in FIG. 4c.

Figure 6:
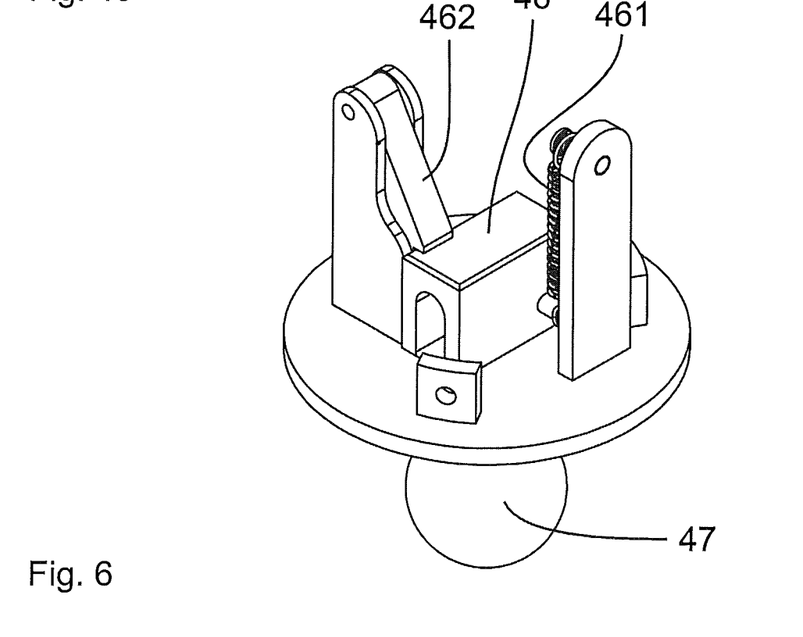

In order to ensure this locking position, a blocking means 46 is further provided, which advances below the slidable shaft 41 in the manner of a locking bar between the scissor mechanism of the two locking levers 14, 15. The locked position is shown in FIG. 4c. The blocking means 46 is shown in further detail in FIG. 6. In the situation shown in FIG. 4c the blocking means 46 is in its blocking position, whereby the two locking levers 14, 15 can not be swung back, so that the locking of the container 2 on the loading surface 3 is supplementally secured.

By pulling on the downwardly projecting actuating element 47 which is provided directly on the blocking means 46, the blocking means 46 is retracted, against the pull tension of a spring 461 disposed within the mechanism, from the locked position into the loading latched position, wherein a removal of the container 2 and a re-loading is possible. In order to keep the blocking means 46 in the loading latched position, that is, in the lower position as shown in FIG. 5, 4a or 4b, counter to the force of the spring 461, a hinge latch 462 is provided, which jumps by means of compression spring 463 when it reaches the load stop position, and prevents a return of the blocking means 46.

During loading, however, via lug 48 on the first locking lever 14 shown in FIG. 5 in the state shown in FIG. 4b, the hinge latch 462 is swung out against the force of the compression spring 463 so that the locking device 46 actuated by the tension spring 461 slips into the locked position.

Figure 7:
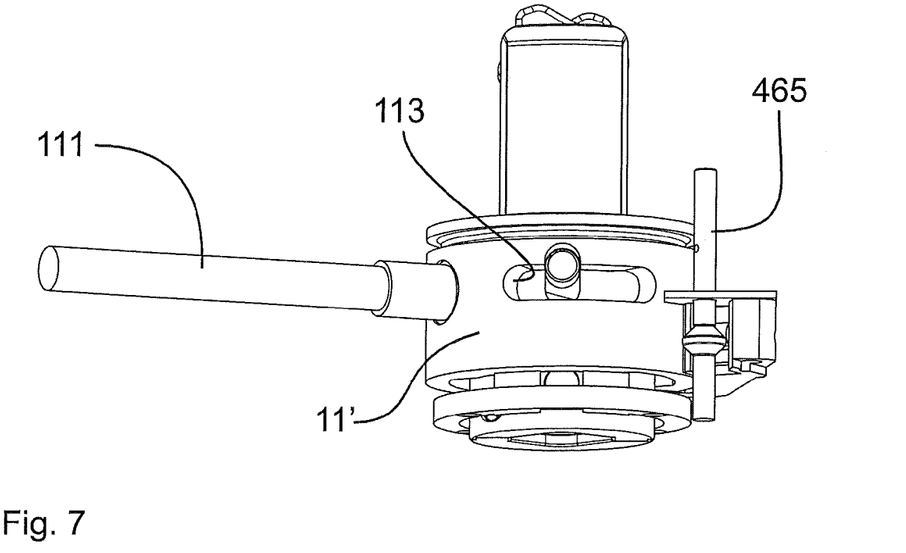
FIG. 7 shows a locking device in three-dimensional view in a second embodiment and FIG. 8 shows the device of FIG. 7 in spatial, partly sectional view.
Figure 8:
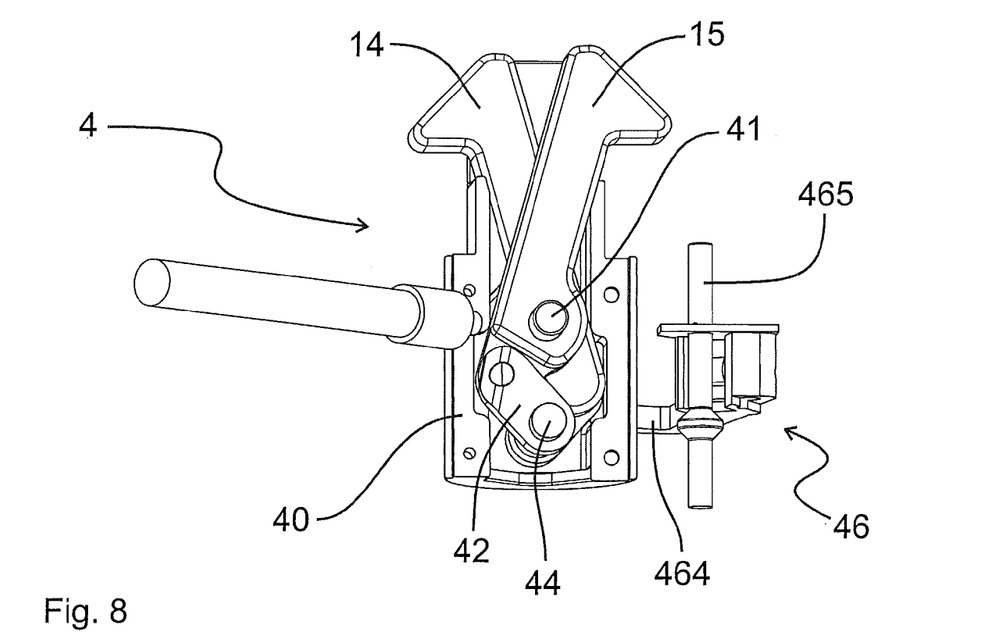

FIGS. 7 and 8 show a second embodiment of the locking device, in which the functionally identical components are indicated with identical reference numerals. In this example also the locking device 1 is designed so that the locking mechanism 4 is housed in a cylindrical housing 40 having a maximum outer diameter of 82.5 mm and a maximum height of 97 mm.

In contrast to the first embodiment shown in FIGS. 1 to 6, in the second embodiment the grooved bushing according to the state of the art shall be replaced by a specially designed grooved bushing 11'. The grooved bushing 11' has in known manner a profiled opening 112, so that as the grooved bushing 11' is rotated about its axis the entire locking device 1 can be lowered to the extent that it no longer protrudes above the loading surface and thus, for example, a 40-foot container can be placed on the bed without interference from the locking device at the center point for positioning of two 20-foot containers.

For this purpose, however, the new grooved bushing 11' has in its cylinder wall two diametrically oppositely disposed, inverted T-shaped slots 113, into which the sliding shaft 41 of the locking mechanism 4 respectively extends into. Accordingly, the movable shaft 41 projects beyond the outer side of the cylindrical housing 40. Due to the actuating lever 111 associated with the grooved bushing 11', the grooved bushing 11' can be rotated in a known manner about the cylinder axis.

In the middle position as shown in FIG. 7, the sliding shaft 41 is in the central region of the inverted T-shaped elongated hole 113, wherein the vertical section of this inverted T-shaped elongated hole 113 matches in its position and orientation with the short slot 45 in the cylindrical housing 40. In order that the grooved bushing 11' is not rotated into its locking position due to the spring preload, a pivot lever 464 located outside of the housing 40 is locked with the grooved bushing 11'.

The loading and unloading position shown in FIG. 7 now allows that a container with its corner fitting 20 can slide over the locking head 10, while the locking levers 14 and 15 are swiveled against the spring load (as shown particularly in FIG. 7), and the container with its corner opening 22 slides past it, so that the locking levers 14, 15 can pivot spring-loaded back to the position shown in FIG. 8, in which case the corner fitting 20 or the container 2 with its wall 21 contacts with a release pin 465, the pivot lever 464 moves outwards against its leaf spring assisted spring bias and thus releases the grooved bushing 11', so that this can rotate in accordance with the spring preload into the position shown in FIG. 8. The pivoting of the locking lever 14, 15 is possible in the position shown in FIG. 7 because of the coincidence of the inverted T-shaped long hole 113 with the short elongated hole 45, so that the sliding shaft 41 can, according to the toggle mechanism arranged in the housing 40, be shifted upwardly and again be shifted back down.

REFERENCE NUMERAL LIST 1 locking device
10 locking head
11, 11' grooved bushing
111 operating lever
112 profiled opening
113 inverted T-shaped slot
12 retaining ring
121 mounting screw
13 centering means 14 first locking lever
15 second locking lever
16 shoulder
2 container
20 corner fitting
21 wall
22 opening
3 loading surface
30 cross beam
31 receiving opening
32 mounting opening
4 locking mechanism
40 housing
41 sliding shaft
42 toggle lever
43 spring
44 fixed shaft
45 short slot
46 locking means
461 spring
462 hinge latch
463 compression spring
464 pivot lever
465 release pin
47 actuating element
48 nose or lug
Z loading and unloading

The invention claimed is:

1. A locking device (1) for locking of a container (2), which container has standardized corner fitting (20) having an opening (22) in a wall (21), onto a loading surface (3) having a standardized receiving opening (31), comprising:
a semi-automatic locking mechanism (4) housed in a cylindrical housing (40),
a locking head (10) connected to the locking mechanism (4) and dimensioned to be guided in the standardized receiving opening (31) of the loading surface (3) between a retracted position in which the locking head (10) is located below the loading surface (3) and a container locking position in which the locking head (10) is dimensioned to engage through the opening (22) and behind the wall (21) of the corner fitting (20) for locking of the container (2) onto the loading surface (3),
a grooved bushing (11) provided below the standardized receiving opening (31) of the loading surface (3), in which the locking device (1) is guided, the grooved bushing (11) pivotable between a first position in which the locking head (10) when in a raised position is free to be retracted into the grooved bushing (11) and a second position in which the locking head (10) in the raised position is supported in the container locking position on the grooved bushing (11) and prevented from being retracted into the grooved bushing (11), and
a retaining ring (12) which engages and holds the locking device (1) underneath the loading surface (3) in a mounting opening (32) in its retracted position,
wherein the cylindrical housing is guided by the grooved bushing (11), the mounting opening (32) and the retaining ring (12).

2. The locking device according to claim 1 wherein the cylindrical housing (40) has an outer diameter d of d≤82.5 mm and a height h of h≤97 mm.

3. The locking device (1) according to claim 1, wherein the locking head (10) is comprised of a first locking lever (14) and a second locking lever (15), wherein the locking levers (14, 15) are arranged in the manner of a scissors mechanism pivotably mounted on a sliding shaft (41) which is oriented perpendicular to a loading and unloading direction (Z), wherein the sliding shaft (41) is mounted to be raised and lowered, wherein when the sliding shaft (41) is lowered, the first and second locking levers (14, 15) are pivoted into the container locking position, and when the sliding shaft (41) is raised, the first and second locking levers (14, 15) are pivoted into a container un-locking position.

4. The locking device (1) according to claim 3, wherein the cylindrical housing has a cylinder axis, and wherein the sliding shaft (41) is guided in short slots (45) oriented parallel to the cylinder axis of the cylindrical housing (40).

5. The locking device (1) according to claim 3, wherein a blocking means (46) is provided which is moveable between a blocking position and an un-blocking position, and which when in the blocking position, prevents an unintentional lifting of the container (2), wherein the blocking means (46) is spring biased by a spring (461) in a direction of the blocking position.

6. The locking device (1) according to claim 5, wherein the blocking means (46) when in the blocking position engages between the scissors mechanism and thus prevents retraction of the locking levers from the container locking position, and when in the un-blocking position allows a repositioning of the locking levers (14, 15) out of the container locking position into the container un-locking position.

7. The locking device (1) according to claim 5, wherein the blocking means (46) has a container locking latched position in which the blocking means (46) is locked in the container locking latched position with a hinged latch (462), wherein, by the pivoting of the locking levers (14, 15), the hinged latch (462) is pivoted against the force of a compression spring (463) and the container locking latched position is released.

8. The locking device (1) according to claim 7, wherein the blocking means (46) has an actuating element (47) with which an operator can adjust a locking position of the blocking means (46).

9. The locking device according to claim 6, wherein for forming the blocking means (46), the sliding shaft (41) projects beyond the outside of the cylindrical housing (40) and the grooved bushing (11') has two diametrically opposed inverted T-shaped slots (113), into which the projecting sliding shaft (41) engages.

10. The locking device according to claim 9, wherein the grooved bushing (11') is mounted pivotable about an axis and is spring biased in a direction of the container locking position, wherein in the container locking position the projecting sliding shaft (41) sits at one end of the T-shaped slots (113).

11. The locking device according to claim 9, wherein the blocking means (46) has a container locked latched position, in which, in the container un-locked position, the blocking means (46) is locked with a pivot lever (464), wherein, a spring load is such that the weight of the container is sufficient to cause the pivot lever (464) to pivot back against a spring blade load, whereby the grooved bushing (11') is pivoted into a middle position due to a spring bias.

12. The locking device (1) according to claim 6, wherein the locking levers (14, 15) each have a shoulder (16) on a side configured to face the wall (21) of, the corner fitting (20) of the container, which in a basic position lie substantially orthogonal to the loading and unloading direction (Z) on the wall (21) of the corner fitting (20) and during unloading by pivoting in the loading position form a ramp, which allows the pivoting of the locking levers (14, 15) in the loading position against the force of a spring (43).

13. A locking device (1) for locking of a container (2), which container has a standardized corner fittings (20) having an opening (22) in a wall (21), onto a loading surface (3)

provided on a hollow profile cross-beam (30), the loading surface (3) being provided with a standardized receiving opening (31) and the cross-beam (30) being provided with a mounting opening (32) below the receiving opening (31), the locking device (1) comprising:
- a semi-automatic locking mechanism (4) housed in a cylindrical housing (40),
- a locking head (10) dimensioned to be guided in the standardized receiving opening (31) of the loading surface (3),
- wherein the locking mechanism (4), the locking head, and the cylindrical housing (40) are operatively associated to be moved together between a retracted position and a container locking position,
- a grooved bushing (11) provided between the standardized receiving opening (31) and the mounting opening (32), the grooved bushing (11) pivotable between a first position in which the locking head (10) in a raised position is free to be retracted into the grooved bushing (11) and a second position in which the locking head (10) in the raised position is supported in the container locking position on a grooved bushing (11) and prevented from being retracted into the grooved bushing (11),
- a retaining ring (12) which engages and holds the grooved bushing (11) against rotation when the locking device (1) is in the retracted position,
- wherein the locking head (10) in the locking position is dimensioned to engage through the opening (22) and behind the wall (21) of the standardized corner fitting (20) of the container (2) for locking the container (2) onto the loading surface (3), and in the retracted position is lowered below the loading surface (3),
- wherein the cylindrical housing (40) is guided by the grooved bushing (11), the mounting opening (32) and the retaining ring (12).

\* \* \* \* \*